United States Patent
Kawano

(10) Patent No.: US 8,385,481 B2
(45) Date of Patent: Feb. 26, 2013

(54) RADIO COMMUNICATION APPARATUS AND OFFSET CORRECTION METHOD

(75) Inventor: Takahiro Kawano, Kanagawa (JP)

(73) Assignee: Renesas Electronics Corporation, Kanagawa (JP)

( * ) Notice: Subject to any disclaimer, the term of this patent is extended or adjusted under 35 U.S.C. 154(b) by 358 days.

(21) Appl. No.: 12/789,615

(22) Filed: May 28, 2010

(65) Prior Publication Data
US 2010/0322288 A1 Dec. 23, 2010

(30) Foreign Application Priority Data
Jun. 17, 2009 (JP) .................................. 2009-144487

(51) Int. Cl.
*H04L 27/06* (2006.01)
(52) U.S. Cl. ...................................................... 375/344
(58) Field of Classification Search ................... 374/344
See application file for complete search history.

(56) References Cited

U.S. PATENT DOCUMENTS

2005/0153676 A1* 7/2005 Ruelke et al. ................. 455/324
2009/0088106 A1* 4/2009 Hwang et al. .............. 455/150.1

FOREIGN PATENT DOCUMENTS
JP 2006-020334 1/2006

* cited by examiner

*Primary Examiner* — Kevin Kim
(74) *Attorney, Agent, or Firm* — Young & Thompson

(57) ABSTRACT

An apparatus includes: an offset adjustment unit that supplies an offset correction signal corresponding to a frequency switching to an adder unit that receives an output from a mixer; a timing adjustment unit that adjusts the timing of a frequency switching signal supplied to a local oscillator and the timing of an offset correction amount switching signal supplied to the offset adjustment unit for changing an offset amount in correspondence with the frequency switching in the local oscillator; a noise amount measurement and calculation unit that receives a signal obtained by amplifying and filtering of the signal from the adder unit, to measure a noise amount of the signal and generates a timing determination signal based on the measured noise amount; and a control unit that controls the timing of the frequency switching signal and the offset correction amount switching signal supplied to the timing adjustment unit, based on the timing determination signal from the noise amount measurement and calculation unit.

18 Claims, 8 Drawing Sheets

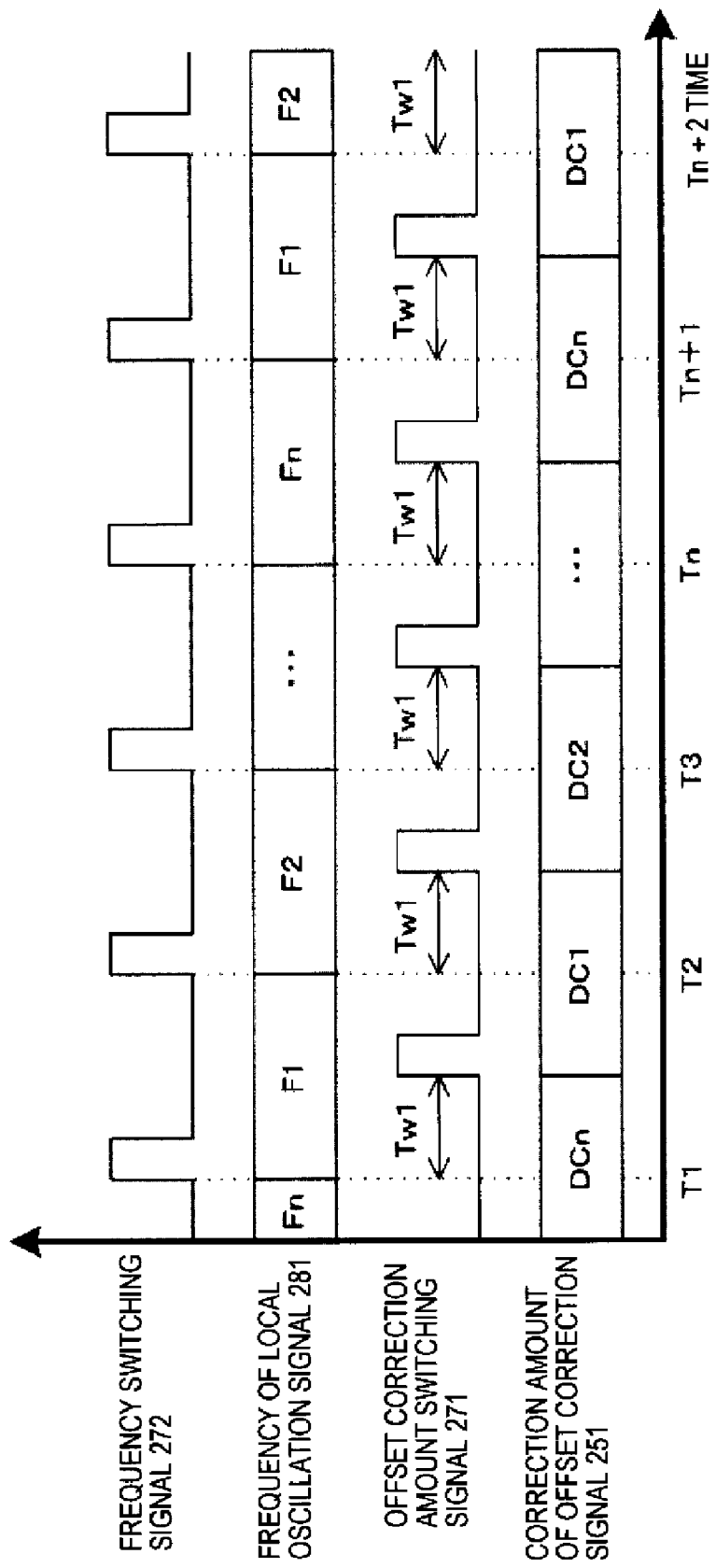

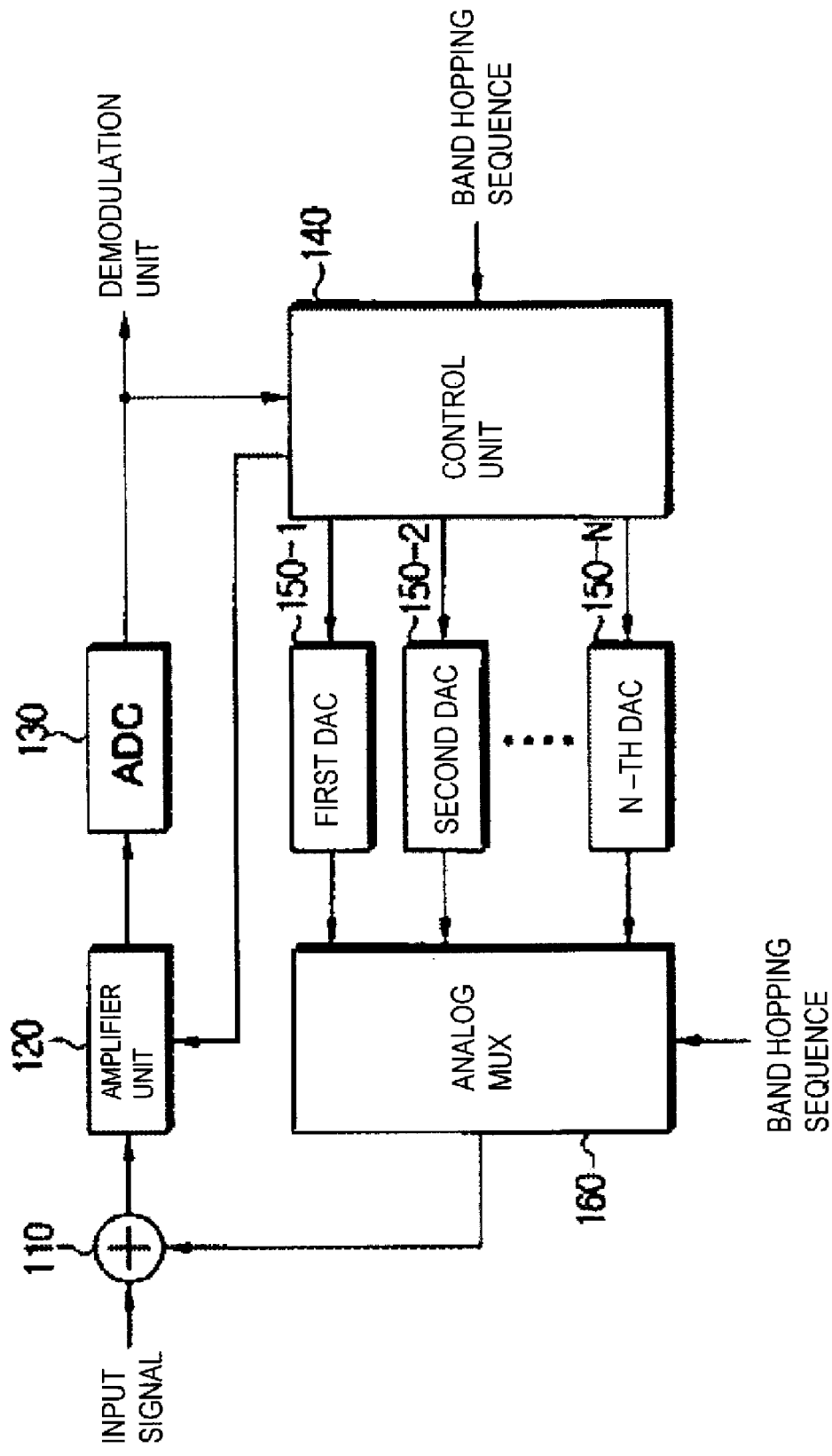

RADIO COMMUNICATION APPARATUS AND OFFSET CORRECTION METHOD

TECHNICAL FIELD

Reference to Related Application

This application is based upon and claims the benefit of the priority of Japanese patent application No. 2009-144487, filed on Jun. 17, 2009, the disclosure of which is incorporated herein in its entirety by reference thereto.

The present invention relates to a radio communication technique, and in particular, to an apparatus and a method suitably applicable to correction of a DC offset caused in a receiving unit of an ultra wide band (UWB) radio communication apparatus having a frequency hopping function.

BACKGROUND

In recent years, along with the spread of the Internet and the like, in the field of communication, a radio communication technique using a UWB has become more important. Particularly, in the field of radio communication, a technique that enables long-distance communication with high resistance to noise from the outside is needed.

Generally, a radio reception unit has a heterodyne architecture or a direct conversion architecture. A radio reception unit of the heterodyne architecture receives a radio-frequency signal via an antenna, converts the radio-frequency signal into an intermediate frequency signal, and converts the intermediate frequency signal into a baseband signal. In contrast, a radio reception unit of the direct conversion architecture can directly convert a radio-frequency signal into a baseband signal.

While the heterodyne architecture requires two or more mixer circuits, the direct conversion architecture requires only one mixer circuit. Thus, the area of an analog section occupying a large circuit area of the radio reception unit can be reduced. The direct conversion architecture has an advantageous effect of reducing the cost of an LSI.

It is known that, in a general communication system using such direct conversion, self-mixing causes a DC offset to be generated in an output signal of a mixer.

When a DC offset is generated, a distortion of a received signal occurs due to the saturation of a circuit. Consequently, since a signal-to-noise ratio of the received signal is lowered and a demodulation error rate is increased, a possible communication distance is shortened.

FIG. 8 illustrates a configuration of a DC offset correction apparatus of a receiver disclosed in FIG. 4 of Patent Document 1. The DC offset correction apparatus of the receiver of FIG. 8 is used in a communication system which performs frequency hopping of a plurality of bands. The DC offset correction apparatus includes: a control unit 140 that generates and outputs a plurality of different DC offset correction signals for a plurality of bands; a plurality of digital-to-analog converters (DACs) 150-1 to 150-N, each of which receives a corresponding one of the plurality of different DC offset correction signals outputted from the control unit 140, converts the received signal from digital to analog, and outputs the converted analog signal; an analog multiplexer (MUX) 160 that carries out a switching operation to output one of the plurality of different DC offset correction signals outputted from the plurality of DACs; an adder unit 110 that adds an output signal from the analog MUX 160 to an input signal and outputs the resultant signal; an amplifier unit 120; and an analog-to-digital converter (ADC) 130. A DC offset correction operation of the apparatus will be hereinafter described.

The amplifier unit 120 amplifies an output signal from the adder unit 110 based on a predetermined gain G to output the amplified signal. The gain G of the amplifier unit 120 is set by the control unit 140.

The signal supplied to the amplifier unit 120 includes a DC offset signal, and as described above, this DC offset signal is generated owing to a local oscillator signal. Since the local oscillator signal differs depending on the band frequency hopped at each timing, the DC offset level also differs depending on the band frequency hopped at each timing. For example, in a communication system in which N frequencies are switched, assuming that a first DC offset signal is generated when a band hopped at a certain timing is a first band, a second DC offset signal is generated when a band hopped at the next timing is a second band, and an N-th DC offset signal is generated when a currently frequency-hopped band is an N-th band, the first to N-th DC offset signals have different levels.

The ADC 130 converts the analog signal amplified and outputted by the amplifier unit 120 to a digital signal. The ADC 130 supplies the digital signal to a demodulation unit and the control unit 140.

The control unit 140 adjusts a DC offset correction signal and outputs the so adjusted DC offset correction signal. Since the level of each DC offset correction signal differs depending on the band, the control unit 140 generates a different DC offset correction signal for each band. The control unit 140 generates and outputs first to N-th DC offset correction signals to the first to N-th DACs 150-1 to 150-n, respectively.

The first to N-th DACs 150-1 to 150-N convert the first to N-th DC offset correction signals from digital to analog, respectively, and output the converted analog signals to the analog MUX 160.

The analog MUX 160 executes a switching operation in synchronization with a rise or fall of a band-hopping sequence signal and outputs one of the first to N-th DC offset correction signals outputted from the first to N-th DACs 150-1 to 150-N, respectively, to the adder unit 110.

The DC offset correction signal output from the analog MUX 160 is added to the DC offset of the input signal supplied to the adder unit 110. In this way, the DC offset is corrected.

Patent Document 1:
JP Patent Kokai Publication No. JP-P2006-20334A (FIG. 4)

SUMMARY

The entire disclosure of Patent Document 1 is incorporated herein by reference thereto.

Problems in related techniques will be hereinafter described based on the present invention.

In the apparatus shown in FIG. 8, a noise may be generated in the output of the adder unit 110. If a noise is generated in the output of the adder unit 110, quality of the analog signal supplied to the ADC 130 is deteriorated and a demodulation error may occur in the demodulation unit, resulting in a shortening in the communication distance.

One of the reasons is as follows. A noise is generated in the output from the adder unit 110 because a path of the signal (received signal) inputted to the adder unit 110 after frequency hopping differs from a path of the DC offset correction signal inputted from the analog MUX 160 to the adder unit 110. Namely, phase shifting (phase difference) is generated between a timing at which the input signal, inclusive of a DC offset component that is changed by frequency hopping, is inputted to the adder unit 110 and a timing at which the DC offset correction signal that is outputted from the analog MUX 160 and that is switched by the band hopping sequence signal (a timing at which the changed DC offset correction signal is inputted to the adder unit 110). The apparatus of FIG. 8 executes DC offset correction on the presumption that the input signal (including a DC offset signal) and the output signal from the analog MUX 160 are inputted to the adder unit 110 at the same timing.

However, in reality, even if switching frequency of the DC offset correction signal is same as the frequency of hopping, it is difficult to synchronize the phase of the DC offset correction signal with that of the input signal. In case of implementing the configuration of FIG. 8 on a semiconductor integrated circuit, even if in the control unit and the analog MUX, the DC offset correction signal should be outputted in synchronization with the band hopping sequence, with phase shifting (phase difference) due to interconnect load or the like between the DC offset correction signal and the input signal inclusive of a DC offset that is changed by frequency hopping, noise is generated.

The present inventor found that the related art the above problems and that Patent Document 1 neither discloses nor suggest the above problems with the configuration of FIG. 8.

To solve at least one of the above problems, basically, the present invention provides the following:

According to the present invention, there is provided a radio communication apparatus including: an offset adjustment unit supplying an offset correction signal having a correction value corresponding to a frequency of a local oscillation signal to an output of a mixer mixing a received signal and the local oscillation signal from a local oscillator; and a timing adjustment unit adjusting a timing at which the offset correction signal in the offset adjustment unit is switched, in correspondence with a timing at which the frequency of the local oscillation signal from the local oscillator is switched.

According to the present invention, there is provided an offset correction method used with a radio communication apparatus in which an offset correction signal having a correction value corresponding to a frequency of a local oscillation signal is supplied to a signal from a mixer mixing a received signal and the local oscillation signal from a local oscillator, wherein a timing at which the offset correction signal in the offset adjustment unit is switched is adjusted based on a timing at which the local oscillation signal frequency outputted from the local oscillator is switched.

According to the present invention, in performing correction of a DC offset of an input signal, the DC offset being changed by frequency hopping, a noise of an output from an adder unit which adds an input signal and a DC offset correction signal is removed, thereby improving signal quality to reduce demodulation error. As a result, the communication distance can be improved.

Still other features and advantages of the present invention will become readily apparent to those skilled in this art from the following detailed description in conjunction with the accompanying drawings wherein only exemplary embodiments of the invention are shown and described, simply by way of illustration of the best mode contemplated of carrying out this invention. As will be realized, the invention is capable of other and different embodiments, and its several details are capable of modifications in various obvious respects, all without departing from the invention. Accordingly, the drawing and description are to be regarded as illustrative in nature, and not as restrictive.

BRIEF DESCRIPTION OF THE DRAWINGS

FIG. 3 is a timing diagram of signals relating to a timing adjustment signal according to the first exemplary embodiment of the present invention.

FIG. 8 is a diagram illustrating a configuration of a DC offset correction apparatus of a receiver according to Patent Document 1.

PREFERRED MODES

Figure 1:
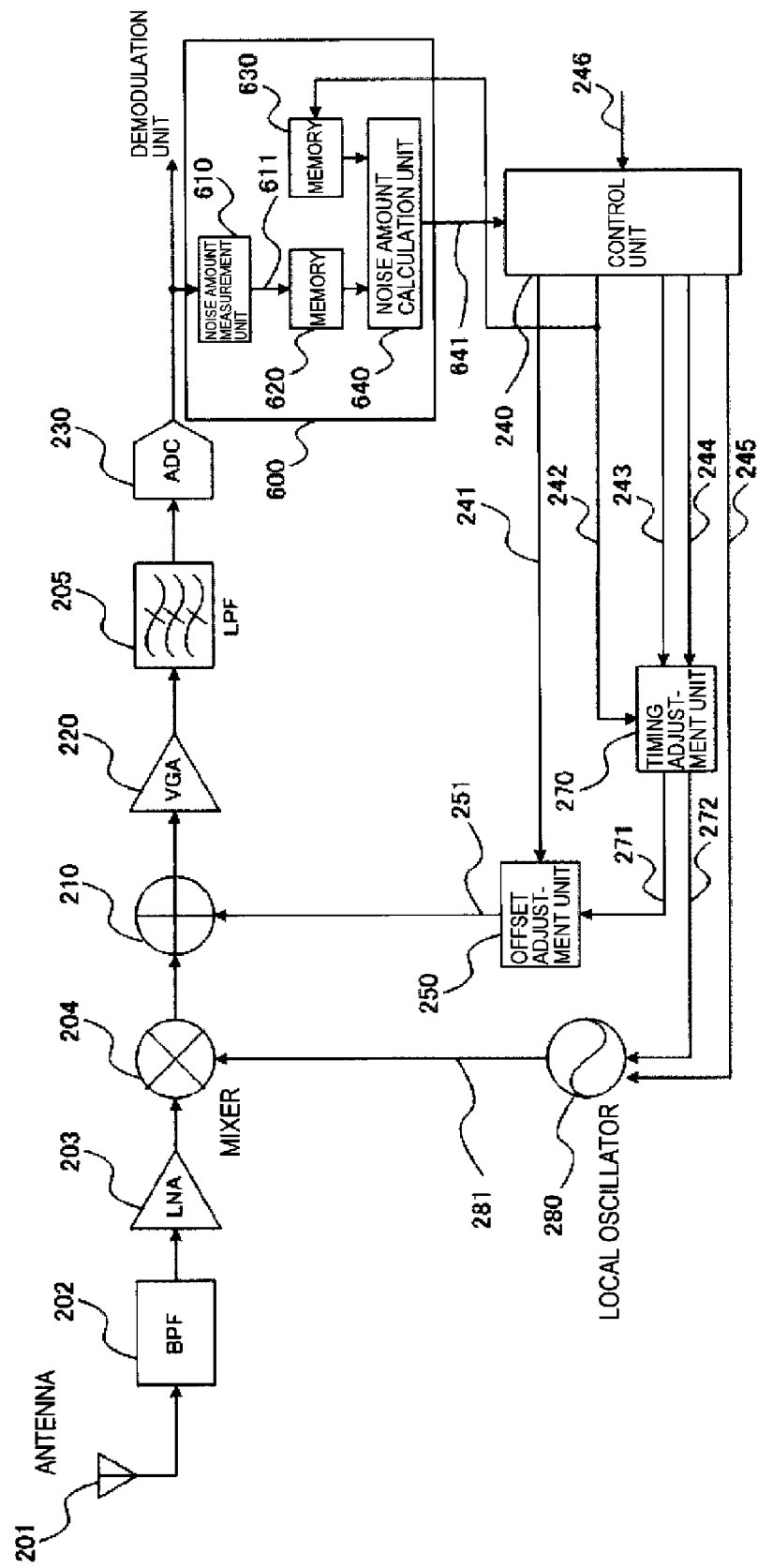
FIG. 1 is a diagram illustrating a configuration of a reception unit of a radio communication apparatus according to a first exemplary embodiment of the present invention.

According to one of modes of the present invention, a radio communication apparatus includes: an offset adjustment unit (250) that supplies an offset correction signal (251) having an offset amount corresponding to a local oscillation frequency to an output of a mixer (204) that mixes a received signal and a local oscillation signal (termed also as local oscillation frequency signal) from a local oscillator (280); and a timing adjustment unit (270) that adjusts a timing at which the offset correction signal from the offset adjustment unit (250) is switched, in correspondence with a timing at which the local oscillation signal frequency in the local oscillator (280) is switched. The timing adjustment unit (270) adjusts a timing of a frequency switching signal (272) supplied to the local oscillator (280) and a timing of an offset correction amount switching signal (271) supplied to the offset adjustment unit (250) for switching an offset amount in correspondence with the frequency switching in the local oscillator (280). According to the present invention, the radio communication apparatus further includes: a noise amount measurement and calculation unit (600) that receives a digital signal, which is obtained by amplification, filtering, and analog to digital conversion of a signal from an adder unit (210) that receives a signal from the mixer (204), measures a noise amount of the digital signal and generates a timing determination signal, based on the measured noise amount; and a control unit (240) that supplies a timing adjustment signal to the timing adjustment unit (270), based on the timing determination signal from the noise amount measurement and calculation unit (600). In the present invention, the offset correction signal (251) which is delayed by an amount (td) corresponding to a delay (td) required for the frequency switching in the mixer (204), with respect to the frequency switching signal (272) supplied to the local oscillator (280), is supplied from the offset adjustment unit (250) to the adder unit (210). The present invention will be hereinafter described based on exemplary embodiments.

Exemplary Embodiment 1

FIG. 1 is a diagram illustrating a configuration of a reception unit of a radio communication apparatus according to a first exemplary embodiment of the present invention. According to the first exemplary embodiment of the present invention, as illustrated in FIG. 1, an antenna 201 receives a signal, and a band pass filter (BPF) 202 selects a band of the signal. A low noise amplifier (LNA) 203 amplifies the signal and outputs the amplified signal to a mixer 204. The mixer 204 performs down-conversion of a radio frequency (RF) signal output from the LNA 203 by using a local oscillation signal (termed also as local oscillation frequency signal) 281, and outputs the obtained baseband signal to an adder unit 210.

The adder unit 210 receives the baseband signal from the mixer 204 and an offset correction signal 251 from an offset adjustment unit 250. The adder unit 210 adds these two signals and outputs an added signal.

With self-mixing, a DC offset is superposed on the baseband signal supplied from the mixer 204 to the adder unit 210. Thus, the offset adjustment unit 250 outputs a pre-estimated DC offset amount to the adder unit 210, and the adder unit 210 adds/subtracts the DC offset to/from the baseband signal to cancel out the DC offset. The adder unit 210 supplies the corrected baseband signal to a VGA (variable gain amplifier) 220.

The VGA 220 receives the baseband signal which undergoes a DC offset correction from the adder unit 210, amplifies the baseband signal to a predetermined signal level, and outputs the amplified baseband signal to a low pass filter (LPF) 205.

The LPF 205 receives the amplified baseband signal from the VGA 220, cuts off a high-frequency component of the signal, and outputs the baseband signal having a high-frequency component cut off to an analog-to-digital converter (ADC) 230.

The ADC 230 receives the baseband signal having a high-frequency component cut off from the LPF 205, performs analog-to-digital conversion of the baseband signal, and outputs the digital signal to a demodulation unit and a noise amount measurement and calculation unit 600.

The noise amount measurement and calculation unit 600 includes a noise amount measurement unit 610, a first memory 620, a second memory 630, and a noise amount calculation unit 640.

The noise amount measurement and calculation unit 600 receives the output signal from the ADC 230 and a timing adjustment signal 242 outputted from a control unit 240, and outputs a timing determination signal 641 outputted from the noise amount calculation unit 640 to the control unit 240.

The control unit 240 receives the timing determination signal 641 outputted from the noise amount calculation unit 640 and a timing adjustment start signal 246 for notifying the start of timing adjustment inputted from outside. The control unit 240 outputs an offset correction amount notification signal 241 to the offset adjustment unit 250, a frequency selection signal 245 to a local oscillator 280; the timing adjustment signal 242, an offset correction amount switching signal 243, and a frequency switching signal 244 to a timing adjustment unit 270; and the timing adjustment signal 242 to the second memory 630.

The timing adjustment unit 270 receives the timing adjustment signal 242, the offset correction amount switching signal 243, and the frequency switching signal 244 outputted from the control unit 240. The timing adjustment unit 270 uses the timing adjustment signal 242 to adjust the timing of the offset correction amount switching signal 243 and that of the frequency switching signal 244. The timing adjustment unit 270 outputs an offset correction amount switching signal 271 and a frequency switching signal 272, both timing of which have been adjusted, to the offset adjustment unit 250 and the local oscillator 280, respectively.

The offset adjustment unit 250 receives the offset correction amount switching signal 271 outputted from the timing adjustment unit 270 and the offset correction amount notification signal 241 outputted from the control unit 240. Responsive to a rise or fall of the offset correction amount switching signal 271, the offset adjustment unit 250 outputs the offset correction signal 251 to the adder unit 210 as an analog signal according to the offset correction amount notification signal 241.

The offset correction amount notification signal 241 outputted from the control unit 240 is a signal which the control unit 240 obtains by pre-estimating and holding the DC offset amount of an output of the mixer 204.

The local oscillator 280 receives the frequency switching signal 272 outputted from the timing adjustment unit 270 and the frequency selection signal 245 outputted from the control unit 240, and outputs the local oscillation signal 281 to the mixer 204.

The local oscillator 280 uses the frequency selection signal 245 outputted from the control unit 240 to select the frequency of the local oscillation signal 281. The local oscillator 280 switches the frequency in synchronization with a rise or fall of the frequency switching signal 272 to realize a frequency hopping operation.

The noise amount measurement unit 610 of the noise amount measurement and calculation unit 600 receives a digital signal from the ADC 230 and outputs a noise amount measurement result signal 611 to the first memory 620. While not particularly limited thereto, the noise amount measurement unit 610 measures a noise amount, by using time average or root mean square (RMS) of the DC level.

The first memory 620 receives and holds the noise amount measurement result signal 611 measured by the noise amount measurement unit 610 during a frequency hopping in timing adjustment. The first memory 620 outputs the noise amount measurement result signal 611 to the noise amount calculation unit 640.

The second memory 630 receives the timing adjustment signal 242 set in the control unit 240 in timing adjustment, holds a set value of the timing adjustment signal 242, and outputs the set value of the timing adjustment signal 242 to the noise amount calculation unit 640.

The noise amount calculation unit 640 receives the noise amount measurement result signal 611 held in the first memory 620 and the timing adjustment signal 242 held in the second memory 630, and outputs the timing determination signal 641 to the control unit 240.

Figure 2:
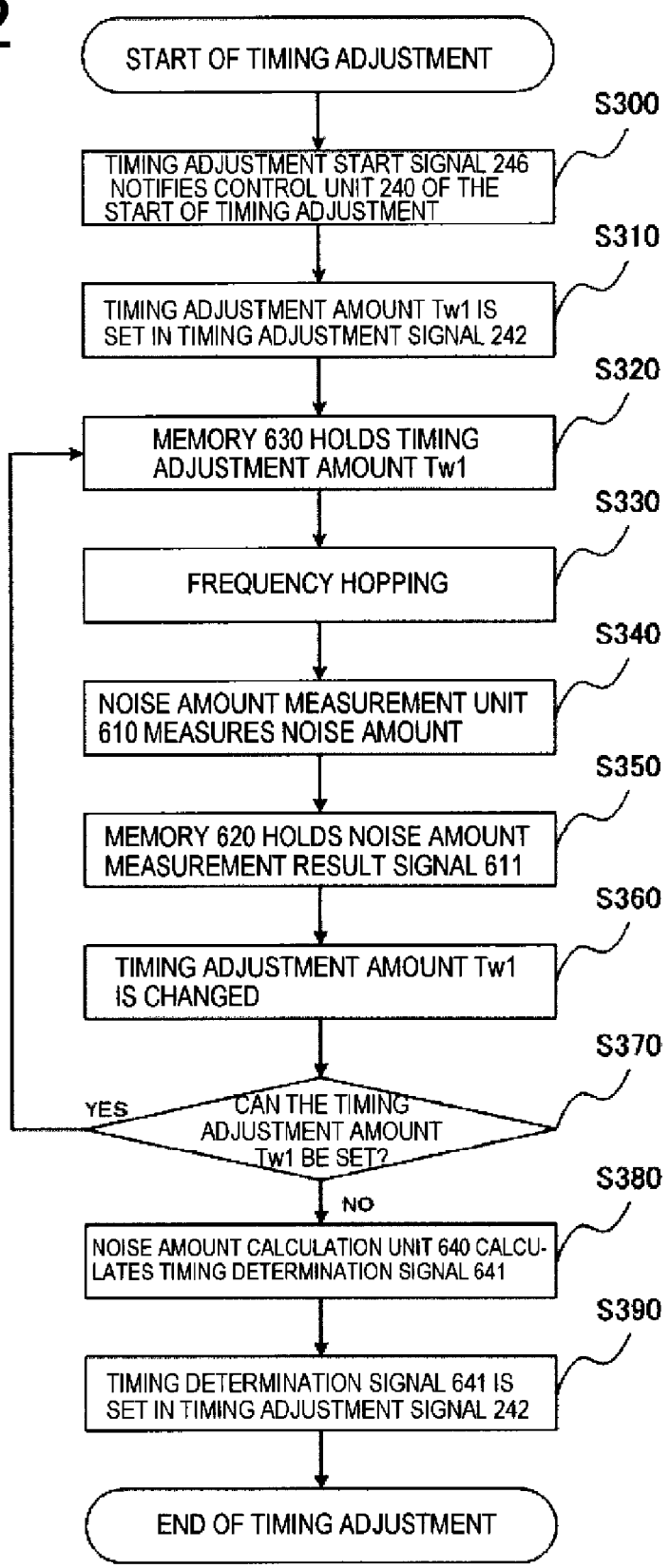
FIG. 2 is a flow chart illustrating a procedure of a timing adjustment method according to the first exemplary embodiment of the present invention.

FIG. 2 is a flow chart illustrating a timing adjustment procedure according to the present exemplary embodiment in FIG. 1. FIG. 2 illustrates a procedure for adjusting the timing of the offset correction amount switching signal 243 and that of the frequency switching signal 244. An operation of the present exemplary embodiment will be described with reference to FIGS. 1 and 2. In the following description of the operation, when a first frequency determined by the frequency selection signal 245 is F1, a first DC offset correction amount outputted as the offset correction signal 251 is DC 1. Similarly, when a second frequency is F2, a second DC offset correction amount is DC2, and when an n-th frequency (n is a certain integer equal to or more than 1) is Fn, the n-th DC offset correction amount is DCn.

First, the timing adjustment start signal 246 is activated, and the control unit 240 is notified of the start of timing adjustment (step S300).

After being notified of the start of timing adjustment via the timing adjustment start signal 246 in step S300, the control unit 240 sets a timing adjustment amount Tw1 in the timing adjustment signal 242 (step S310).

The control unit 240 writes and holds the timing adjustment amount Tw1 set in step S310 or step S360 in the second memory 630 (step S320).

The control unit 240 performs control of frequency hopping for timing adjustment (step S330).

During frequency hopping,
in case the frequency of the local oscillation signal 281 is the first frequency F1, the offset adjustment unit 250 outputs the first DC offset correction amount DC1 to the adder unit 210 as the offset correction signal 251,
in case the frequency of the local oscillation signal 281 is the second frequency F2, the offset adjustment unit 250 outputs the second DC offset correction amount DC2, and in case the frequency of the local oscillation signal 281 is the n-th frequency Fn, the offset adjustment unit 250 outputs the n-th DC offset correction amount DCn.

The noise amount measurement unit 610 measures a noise amount of an output from the ADC 230 during the frequency hopping in step S330 and outputs the measured noise amount as the noise amount measurement result signal 611 to the first memory 620 (step S340).

The control unit 240 writes and holds the measurement result of the noise amount measurement result signal 611 measured in step S340 in the first memory 620 (step S350).

The control unit 240 changes the timing adjustment amount Tw1 (step S360). The set value of the timing adjustment signal 242 can be changed by using a counter (not illustrated) in the control unit 240 and increasing the timing adjustment amount Tw1. Alternatively, predetermined timing adjustment amounts Tw1 may be set in sequence by using a sequencer in the control unit 240.

The control unit 240 decides whether or not it is possible to set the timing adjustment amount Tw1 in step S360. If possible, the control unit 240 sets the timing adjustment amount Tw1 in the timing adjustment signal 242 and the operation returns to step S320. If not in step S370, the operation proceeds to step S380.

The noise amount calculation unit 640 calculates a minimum value of the measurement results of the noise amount measurement result signal 611 held in the first memory 620, and finds the timing adjustment signal 242 from the second memory 630, corresponding to a value for which the noise amount measurement result assumes the minimum value. The noise amount calculation unit 640 outputs the resultant signal (the timing set value so that the measurement result assumes a minimum noise amount) to the control unit 240 as the timing determination signal 641 (step S380).

The control unit 240 sets the timing determination signal 641 found by the noise amount calculation unit 640 in step S380 in the timing adjustment signal 242 and outputs the timing adjustment signal 242 to the timing adjustment unit 270 (step S390).

FIG. 3 is a timing diagram of signals relating to the timing adjustment signal 242 according to the first exemplary embodiment of the present invention. FIG. 3 illustrates timings at which the offset correction amount switching signal 271, the frequency switching signal 272, the frequency of the local oscillation signal 281, and the correction amount of the offset correction signal 251 are changed.

When the frequency switching signal 272 is switched from a low level to a high level at time T1, the frequency of the local oscillation signal 281 is switched to F1. Similarly, the frequency of the local oscillation signal 281 is switched to F2 at time T2 and to Fn at time Tn.

While the frequency switching signal 272 is switched from a low level to a high level at time T2, the offset correction amount switching signal 271 is switched from a low level to a high level earlier or later by time Tw1 (at time T1+Tw1 in FIG. 3). When the offset correction amount switching signal 271 is changed from a low level to a high level, the correction amount of the offset correction signal 251 is changed to DC1.

Similarly, the correction amount of the offset correction signal 251 is changed to DC2 at time T2+Tw1 and to DCn at time Tn+Tw1.

Tn, Tn−1, and Tw1 satisfies the following:

$$Tn-Tn-1 > |Tw1|.$$

According to the present exemplary embodiment, the radio communication apparatus includes the frequency switching signal 272 for switching the local oscillation frequency in the local oscillator 280, an offset correction amount switching signal 271 for changing the offset amount in the offset adjustment unit 250, and the timing adjustment unit 270 for adjusting the timings. The local oscillator 280 receives the frequency switching signal 272, and the offset adjustment unit 250 receives the offset amount switching signal 271. By adjusting the timing at which the frequency of the local oscillation signal 281 outputted from the local oscillator 280 is switched and the timing at which the offset correction amount 250 outputted from the offset adjustment unit 250 is switched, the noise superposed on the received signal can be removed, the quality of the analog signal supplied to the ADC 230 can be improved, a demodulation error can be reduced, and the communication distance can be improved.

FIGS. 4A to 4C and FIGS. 5A to 5C are timing charts of a comparative example (FIG. 4) and the present exemplary embodiment (FIG. 5), when three frequencies are used for frequency hopping. These figures illustrate timing waveforms of the signals inputted to the adder unit 210 (the DC offset of an output from the mixer 204 and the offset correction signal 251 from the offset adjustment unit 250) and the signal from the adder unit 210. Operations of the comparative example and the present exemplary embodiment will be described with reference to FIGS. 4A to 4C and FIGS. 5A to 5C.

Figure 4A:
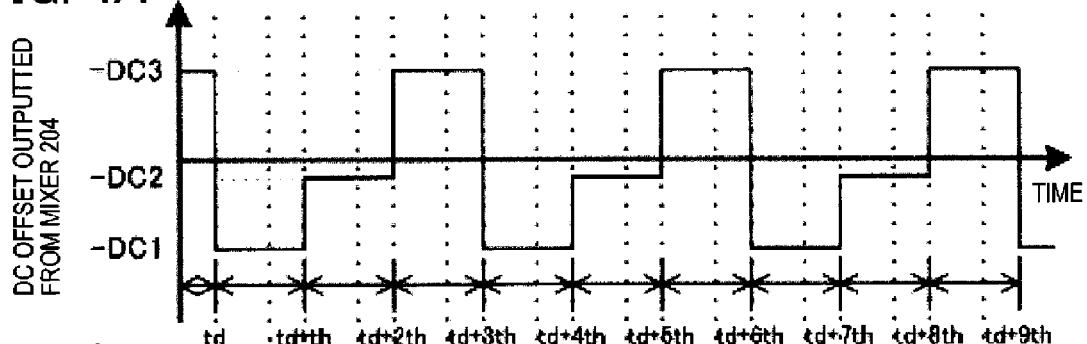
FIGS. 4A to 4C are timing diagrams of signals inputted to and outputted from an adder unit according to a comparative example used in the present invention.
Figure 4B:
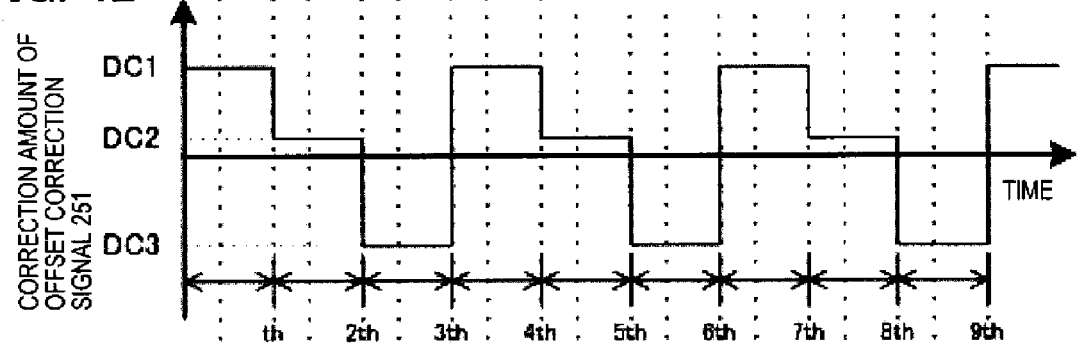
Figure 4C:
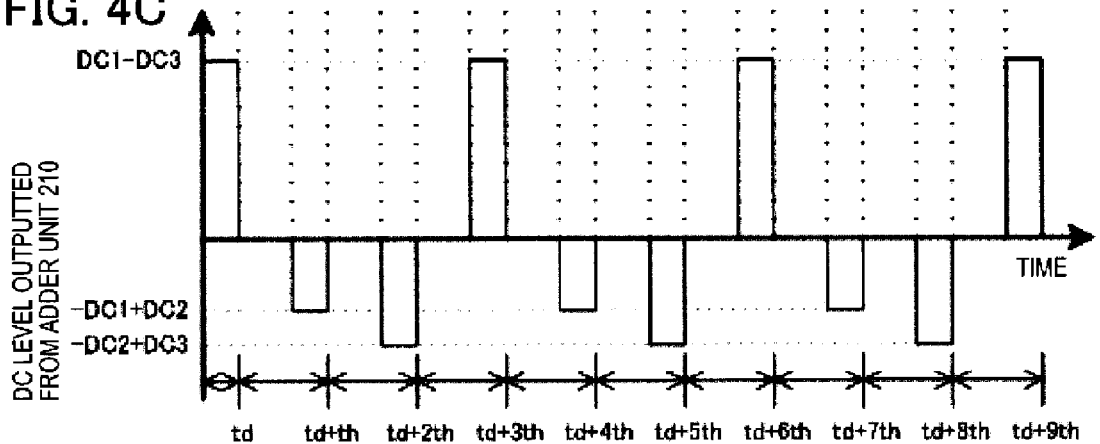

In FIGS. 4A to 4C, a difference between the timing at which the frequency of an output from the mixer 204 is switched and the timing at which the offset correction signal 251 is switched before timing adjustment is denoted by td. A frequency hopping cycle is denoted by th.

In the following, it is assumed that when the hopping frequency is a first frequency F1, a first DC offset amount is DC1, when the hopping frequency is a second frequency F2, a second DC offset amount is DC2, and when the hopping frequency is a third frequency F3, a third DC offset amount is DC3.

FIGS. 4A to 4C are timing waveforms illustrating generation of noise according to the comparative example (FIG. 8). These figures are used to illustrate how noise is generated when timing adjustment cannot be performed.

The offset correction signal 251 in FIG. 4B outputs DC1 at time 0, DC2 at time th, DC3 at time 2th, and DC1 again at time 3th. Thereafter, the offset correction signal 251 outputs DC1, DC2, and DC3 repeatedly at intervals of time th.

As illustrated in FIG. 4A, the frequency change of the DC offset of an output from the mixer 204 is delayed by time td with respect to the offset correction signal 251. The mixer 204 outputs −D3 at time 0, −DC1 at time td, −DC2 at time td+th, −DC3 at time td+2th, and −DC1 again at time td+3th. Thereafter, the mixer 204 outputs −DC1, −DC2, and −DC3 repeatedly at intervals of time th.

Change of the output from the mixer 204 is delayed by time td with respect to the timing at which the offset correction amount is changed. Thus, as illustrated in FIG. 4C, the DC level of output of the adder unit 210 as follows:

DC1-DC3 at time 0,
0 at time td,
−DC1+DC2 at time th,
0 at time td+th,
−DC2+DC3 at time 2th,
0 at time td+2th, and
DC1-DC3 again at 3th.

Thereafter, the adder unit 210 repeatedly outputs a noise at time m×th (where m is a positive integer) and outputs 0 at td+m+th.

FIG. 5 is a diagram illustrating the removal of a noise according to the first exemplary embodiment of the present invention.

Figure 5A:
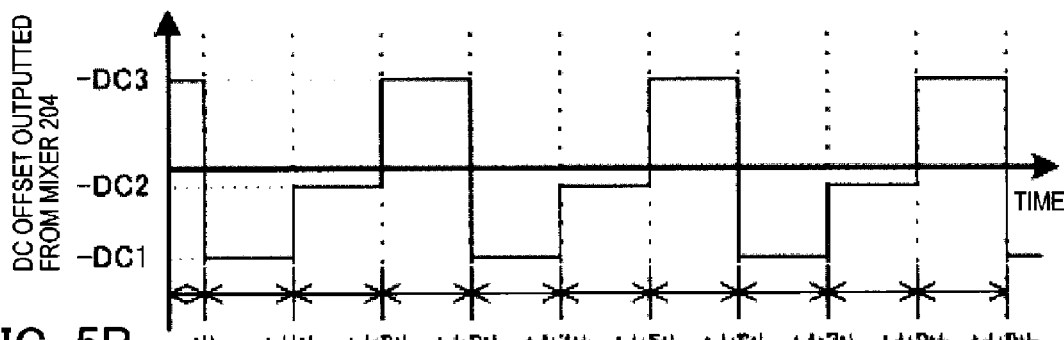
FIGS. 5A to 5C are timing diagrams of signals inputted to and outputted from an adder unit according to the first exemplary embodiment of the present invention.
Figure 5B:
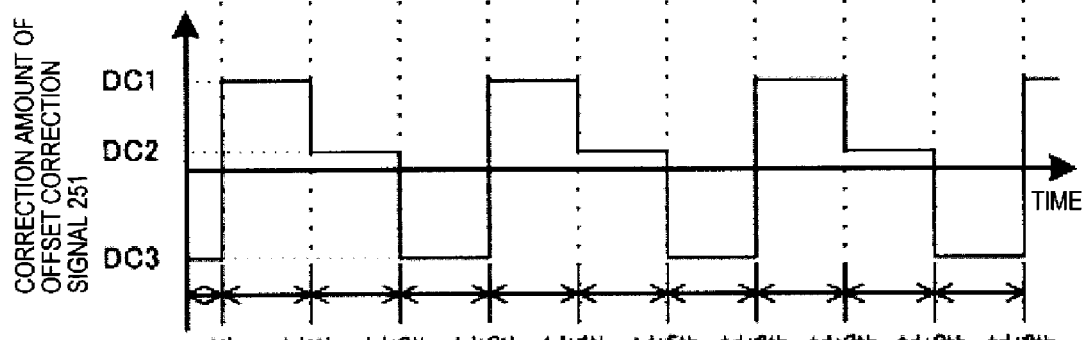

As illustrated in FIG. 5B, the offset correction signal 251 is adjusted by timing adjustment to be delayed by the delay amount td generated in the switching of the frequency of an output of the mixer 204. Thus, the offset correction signal 251 outputs DC3 at time 0, DC1 at time td, DC2 at time td+th, DC3 at time td+2th, and DC1 again at time td+3th. Thereafter, the offset correction signal 251 outputs DC1, DC2, and DC3 repeatedly at intervals of time th.

Since the DC offset of an output from the mixer 204 in FIG. 5A is identical to that of FIG. 4A, the description thereof is omitted.

Figure 5C:
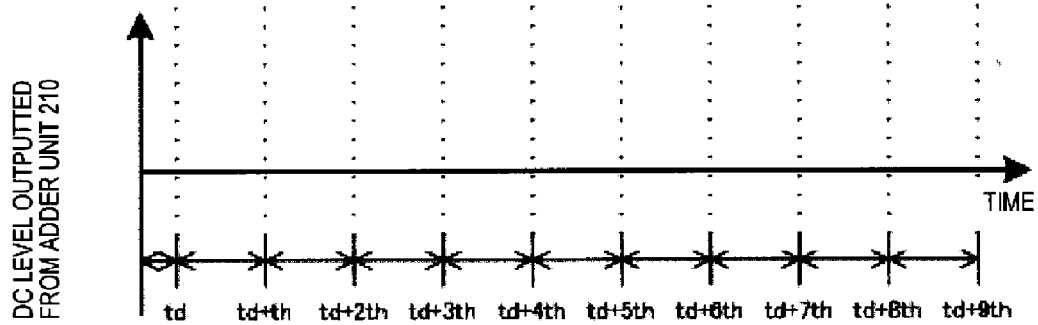

In the adder unit 210, the DC offset of an output from the mixer 204 as an input signal and the correction amount of the offset correction signal 251 from the offset adjustment unit 250 have an inverted relationship. As illustrated in FIG. 5C, since the DC offset of an output from the mixer 204 and the offset correction signal 251 from the offset adjustment unit 250 are canceled out, an output of the adder unit 210 has a zero DC offset.

A noise is not superposed on the output from the adder unit 210, and a noise is not superposed on the output from the ADC 230. As a result, the quality of the received signal is improved, and demodulation error in the digital section is reduced. Thus, the communication distance is improved.

When the present invention is applied to ultra wideband (UWB) wireless communication, the minimum reception sensitivity indicating the strength of a received signal, where a packet error rate which is a rate of frames inclusive of demodulation error to received frames is 8% or less, is improved by 2 dB. As a result, the communication distance is improved by 1.5 times.

Exemplary Embodiment 2

Figure 6:
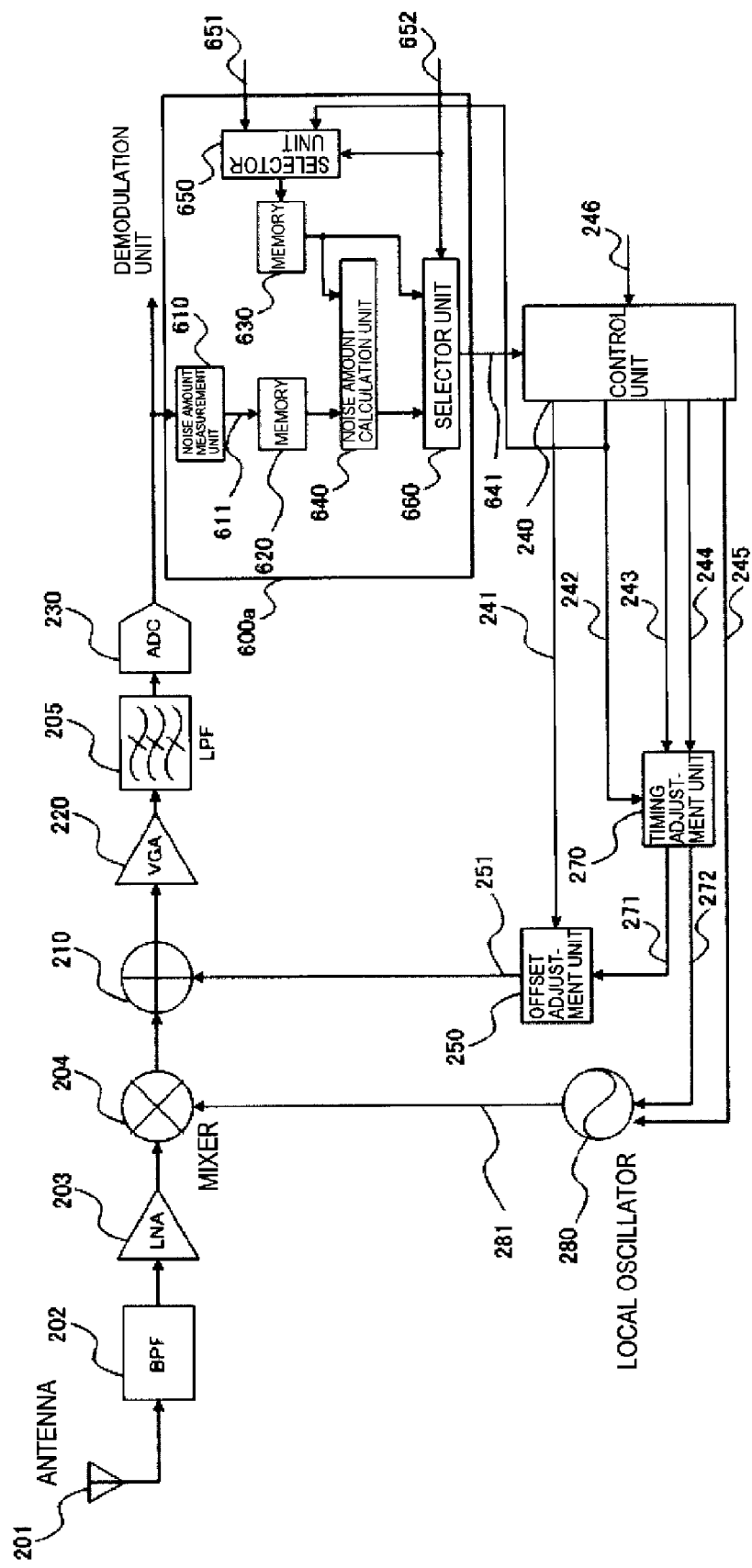
FIG. 6 is a diagram illustrating a configuration of a reception unit of a radio communication apparatus according to a second exemplary embodiment of the present invention.

FIG. 6 illustrates a configuration of a reception unit of a radio communication apparatus according to a second exemplary embodiment of the present invention. In FIG. 6, elements identical to those in FIG. 1 are denoted by the identical reference numerals, and the descriptions thereof will be omitted appropriately. Differences between FIG. 1 and FIG. 6 will be hereinafter described. In the second exemplary embodiment of the present invention as illustrated in FIG. 6, the noise amount measurement and calculation unit is configured differently from that of the first exemplary embodiment illustrated in FIG. 1. In the second exemplary embodiment, by setting the timing adjustment amount Tw1 via a timing adjustment memory input signal 651 in advance, the timing adjustment signal 242 inputted to the timing adjustment unit 270 can be set.

A noise amount measurement and calculation unit 600a includes a first selector unit 650, a second selector unit 660, a path select signal 652, and the timing adjustment memory input signal 651, in addition to the configuration of FIG. 1.

The first selector unit 650 receives the timing adjustment memory input signal 651 and the timing adjustment signal 242 outputted from the control unit 240, and selects one of the timing adjustment memory input signal 651 and the timing adjustment signal 242 for supply to the second memory 630, according to the inputted path select signal 652.

The second selector unit 660 receives signals outputted from the noise amount calculation unit 640 and the second memory 630. According to the path select signal 652, the second selector unit 660 receives an output from the noise amount calculation unit 640 and an output from the second memory 630 and selects one of the outputs received for supply to the control unit 240 as the timing determination signal 641.

In the first exemplary embodiment, the timing adjustment signal 242 inputted to the timing adjustment unit 270 is adjusted automatically. In the present exemplary embodiment, the timing adjustment signal 242 inputted to the timing adjustment unit 270 can be set, by setting the timing adjustment amount Tw1 in advance via the timing adjustment memory input signal 651.

In the present exemplary embodiment, for example, in the UWB wireless communication, a resistor and a software program executed on a CPU in a radio communication apparatus may be used for timing adjustment so that the reception-signal packet error rate is minimized. Namely, the timing adjustment memory input signal 651 stored in the resistor or derived by the CPU in the radio communication apparatus is inputted to the control unit 240 as the timing determination signal 641 via the first selector unit 650, the second memory 630, and the second selector unit 660.

In the present exemplary embodiment, the timing determination signal 641 can be adjusted based on the timing adjustment memory input signal 651 and the path select signal 652 both externally supplied. The present exemplary embodiment is effective when the timing of an input signal (frequency switching) and that of a DC offset adjustment signal are known in advance.

Exemplary Embodiment 3

Figure 7:
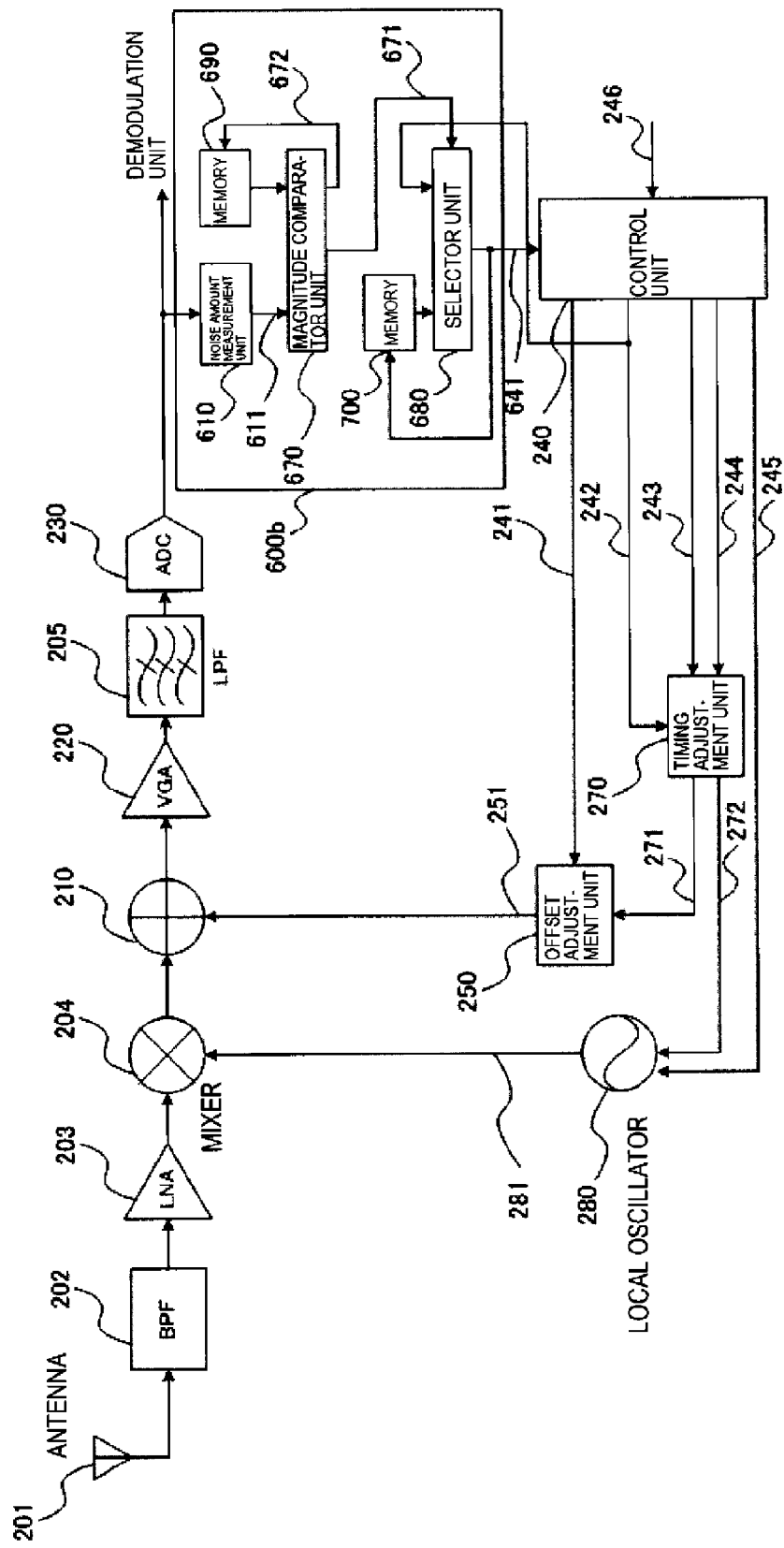
FIG. 7 is a diagram illustrating a configuration of a reception unit of a radio communication apparatus according to a third exemplary embodiment of the present invention.

FIG. 7 is a diagram illustrating a configuration of a reception unit of a radio communication apparatus according to a third exemplary embodiment of the present invention. In FIG. 7, elements identical to those in FIG. 1 are denoted by the identical reference numerals, and the description thereof will be omitted appropriately. Differences between FIG. 1 and FIG. 7 will be hereinafter described. In the third exemplary embodiment of the present invention illustrated in FIG. 7, the noise amount measurement and calculation unit is configured differently from that of the first exemplary embodiment illustrated in FIG. 1. In the present exemplary embodiment, a measured noise value is compared with a value stored in a memory 690 (an initial value is a maximum value), and the smaller value is written in the memory 690. Namely, since the memory 690 holds only the minimum value, the storage capacity of the memory 690 can be reduced.

In a noise amount measurement and calculation unit 600b, there are added a magnitude comparator unit 670, a selector unit 680, a magnitude comparison select signal 671, and a magnitude comparison result signal 672. Also provided the memory 690 and a memory 700, instead of the memories 620 and 630.

The magnitude comparator unit 670 receives the noise amount measurement result signal 611 outputted from the noise amount measurement unit 610 and an output from the memory 690, performs magnitude comparison of the noise amounts, and outputs the smaller one to the memory 690 as the magnitude comparison result signal 672. The magnitude comparator unit 670 outputs the magnitude comparison select signal 671 indicating the smaller one out of the noise amount measurement result signal 611 and the signal from the memory 690 to the selector unit 680.

If the magnitude comparison unit 670 determines that the output from the memory 690 is smaller, the magnitude comparator unit 670 controls the magnitude comparison select signal 671 so that the selector unit 680 outputs a signal supplied from the memory 700. If not, the selector unit 680 outputs the timing adjustment signal 242.

The selector unit 680 receives an output from the memory 700, the timing adjustment signal 242 outputted from the control unit 240, and the magnitude comparison select signal 671. The selector unit 680 selects one out of the output from the memory 700 and the timing adjustment signal 242 outputted from the control unit 240 for supply to the control unit 240 as the timing determination signal 641, according to the magnitude comparison select signal 671.

The memory 690 receives and holds the magnitude comparison result signal 672 outputted from the magnitude comparator unit 670, and outputs the held signal to the magnitude comparator unit 670.

The memory 700 receives and holds the timing determination signal 641 outputted from the selector unit 680, and outputs the held signal to the selector unit 680.

The memory 690 holds a minimum value of the noise amount measurement result signal 611, and the memory 700 holds a set value of the timing adjustment signal 242 when the noise amount measurement result signal 611 assumes a minimum value. Thus, since the memories 690 and 700 hold only minimum value data, the processing can be executed with small capacity memories, and as a result, the area of the LSI can be reduced.

The present exemplary embodiment is advantageous when the memory data amount is increased, such as, when supporting a higher resolution of the timing adjustment amount Tw1 in order to improve accuracy, or when the value of the timing adjustment amount Tw1 is increased (when the reception unit is mounted on a large-scale chip and interconnect load or the like is thereby increased).

In the present exemplary embodiment as well, noise can be removed. By executing calibration, determining an optimum timing adjustment amount, and adjusting the timing of the frequency switching signal and that of the offset correction amount switching signal based on the determined adjustment amount, the generation of noise can be prevented.

The above exemplary embodiments have advantageous effects described below.

1) The communication distance can be improved by noise removal.

The reason for the above effect is that, since noise superposed on the received signal can be removed by adjusting the timing of the frequency switching signal and that of the offset correction amount switching signal, the quality of the analog signal supplied to the ADC is improved and demodulation error is decreased.

2) Convergence error in auto gain control (AGC) can be reduced.

The reason for this effect is that, since only a desired waveform remains in a received signal as a result of noise removal, measurement error of an electric field intensity in a receiver are decreased. Namely, since the received signal does not include noise, convergence error in AGC is reduced and the gain is converged to a desired level. Thus, the received signal is not distorted and the dynamic range of an AD converter can be fully used. As a result, the quality of the analog signal is improved and a demodulation error is decreased.

3) The area and current of an AD converter can be reduced.

The reason for this effect is that, since, in the case of a received signal including noise (desired waveform+noise), the received signal needs to be converted from analog to digital without distorting noise, it is necessary to extend the input range of an analog signal supplied to an AD converter and increase the number of bits to maintain the same bit accuracy. However, in the present exemplary embodiment, since a noise is removed, only the desired waveform can be converted from analog to digital without distortion. Therefore, the input range of the analog signal supplied to the AD converter can be narrowed and the bit number can be reduced.

The disclosure of the above Patent Document is incorporated herein by reference thereto. Modifications and adjustments of the exemplary embodiments and examples are possible within the scope of the overall disclosure (including the claims) of the present invention and based on the basic technical concept of the invention. Various combinations and selections of various disclosed elements are possible within the scope of the claims of the present invention. That is, the present invention of course includes various variations and modifications that could be made by those skilled in the art according to the overall disclosure including the claims and the technical concept.

What is claimed is:

1. A radio communication apparatus comprising:
   a local oscillator that generates a local oscillation signal;
   a mixer that performs mixing of a received signal and the local oscillation signal from the local oscillator;
   an offset adjustment unit that supplies an offset correction signal having a correction value corresponding to a frequency of the local oscillation signal to an output of the mixer; and
   a timing adjustment unit that adjusts a timing at which the offset correction signal in the offset adjustment unit is switched, in correspondence with a timing at which the frequency of the local oscillation signal in the local oscillator is switched, the timing adjust unit adjusting a timing of a frequency switching signal supplied to the local oscillator for instructing switching of the frequency, and a timing of an offset correction amount switching signal supplied to the offset adjustment unit for switching the offset correction signal corresponding to the switching of the frequency in the local oscillator.

2. The radio communication apparatus according to claim 1, further comprising:
   an adder unit that adds the offset correction signal from the offset adjustment unit to the output from the mixer,
   wherein, based on the offset correction amount switching signal, the offset adjustment unit delays the offset correction signal with a delay amount corresponding to a time required for frequency switching in the mixer to supply the so delayed offset correction signal to the adder unit.

3. The radio communication apparatus according to claim 2, further comprising:
   a noise amount measurement and calculation unit that measure a noise amount from a digital signal obtained by amplification, filtering, and analog to digital conversion of an output from the adder unit and generates a timing determination signal, based on the measured noise amount; and a control unit that supplies a timing adjustment signal to the timing adjustment unit, based on the timing determination signal from the noise amount measurement and calculation unit.

4. The radio communication apparatus according to claim 3, wherein the control unit receives the timing determination signal from the noise amount measurement and calculation unit, supplies an offset correction amount notification signal to the offset adjustment unit, supplies a frequency select signal to the local oscillator, and supplies the timing adjustment signal, the offset correction amount switching signal, and the frequency switching signal to the timing adjustment unit.

5. The radio communication apparatus according to claim 4, wherein the control unit receives a timing adjustment start signal notifying the start of timing adjustment.

6. The radio communication apparatus according to claim 4, wherein the noise amount measurement and calculation unit comprises a memory that receives and holds the timing adjustment signal from the control unit, the noise amount measurement and calculation unit generating the timing determination signal, based on a measurement result of the noise amount and the timing adjustment signal.

7. The radio communication apparatus according to claim 4, wherein the timing adjustment unit receives the timing adjustment signal, the offset correction amount switching signal, and the frequency switching signal from the control unit, adjusts the timing of the offset correction amount switching signal and the timing of the frequency switching signal, based on the timing adjustment signal, supplies the offset correction amount switching signal whose timing has been adjusted to the offset adjustment unit, and supplies the frequency switching signal whose timing has been adjusted to the local oscillator.

8. The radio communication apparatus according to claim 3, wherein the noise amount measurement and calculation unit receives a timing adjustment memory input signal supplied from an outside of the noise amount measurement and calculation unit, and generates the timing determination signal based on the timing adjustment memory input signal.

9. The radio communication apparatus according to claim 3, wherein the noise amount measurement and calculation unit comprises:

a noise amount measurement unit that measures a noise amount from the digital signal obtained by amplification, filtering, and analog to digital conversion of an output from the adder unit;

a first memory that holds a measurement result obtained by the noise amount measurement unit;

a second memory that holds the timing adjustment signal from the control unit; and a noise amount calculation unit that outputs the timing determination signal by referring to the first and second memories.

10. The radio communication apparatus according to claim 3, wherein the noise amount measurement and calculation unit comprises:

a noise amount measurement unit that measures a noise amount from the digital signal obtained by amplification, filtering, and analog to digital conversion of an output from the adder unit;

a first memory that holds measurement results obtained by the noise amount measurement unit;

a first selector that selects one of a timing adjustment memory input signal supplied to the noise amount measurement and calculation unit and the timing adjustment signal from the control unit;

a second memory that holds a signal from the first selector;

a noise amount calculation unit that outputs the timing determination signal by referring to the first and second memories; and a second selector that selects one of a signal from the noise amount measurement and calculation unit and a signal from the second memory to output the selected signal as the timing determination signal.

11. The radio communication apparatus according to claim 3, wherein the noise amount measurement and calculation unit holds a minimum value of the noise-amount measurement result and a setting value of the timing adjustment signal when the noise amount measurement result assumes the minimum value.

12. The radio communication apparatus according to claim 3, wherein the noise amount measurement and calculation unit comprises:

a noise amount measurement unit that measures a noise amount from the digital signal obtained by amplification, filtering, and analog to digital conversion of an output from the adder unit;

a first memory;

a magnitude comparator unit that compares the noise amount measurement result from the noise amount measurement unit with a value in the first memory, wherein, when the noise amount measurement result from the noise amount measurement unit is smaller than the value in the first memory, the first memory is updated by the noise amount measurement result from the noise amount measurement unit; and a second selector that selects one of the timing adjustment signal from the control unit and a value in a second memory based on a result of the comparison by the magnitude comparator unit;

wherein a signal from the second selector is outputted to the control unit as the timing determination signal and held in the second memory.

13. A radio communication apparatus comprising:

a local oscillator with a frequency hopping function;

a circuit that corrects a DC offset caused by self-mixing;

a measurement unit that measures a timing of frequency hopping and measures a noise amount when a DC offset correction amount for a corresponding frequency is set;

a timing adjustment unit that adjusts a timing of frequency hopping and a timing at which the DC offset correction amount is changed; and a control unit that performs control to adjust timing.

14. The radio communication apparatus according to claim 13, wherein the measurement unit comprises:

a noise amount measurement unit that measures a noise amount;

a measurement result holding circuit that holds a measurement result of a noise amount obtained by the noise amount measurement unit;

a set value holding circuit that holds a set value for timing adjustment outputted from the control unit; and a noise amount calculation unit that calculates a noise amount and outputs a timing adjustment result.

15. The radio communication apparatus according to claim 13, wherein the measurement unit comprises:
- a noise amount measurement unit that measures a noise amount;
- a measurement result holding circuit that holds a measurement result of the noise amount measured by the noise amount measurement unit;
- a set value holding circuit that holds a set value for timing adjustment outputted from the control unit;
- a first selector that selects one of a set value for timing adjustment held in the set value holding circuit and a set value for timing adjustment inputted to the measurement unit, according to a set value select signal supplied thereto;
- a noise amount calculation unit that calculates a noise amount; and
- a second selector that selects and outputs one of an output from the noise amount calculation unit and an output from the set value holding circuit, according to an output select signal supplied thereto.

16. The radio communication apparatus according to claim 13, wherein the measurement unit comprises:
- a noise amount measurement unit that measures a noise amount;
- a measurement result holding circuit that holds a noise amount measurement result obtained by the noise amount measurement unit;
- a magnitude comparator unit that compares the noise amount measurement result with a value stored in the holding circuit to detect the value having a smaller noise amount;
- a set value holding circuit that holds a timing adjustment result signal from a selector; and
- the selector that selects either one of a set value for timing adjustment outputted from the control unit and the timing adjustment result signal held in the set value holding circuit, according to the noise comparison result.

17. An offset correction method of a radio communication apparatus, the method comprising:
- performing amplification, filtering, and analog to digital conversion of a signal obtained by adding the offset correction signal to the output from the mixer;
- measuring a noise amount of the digital signal;
- generating a timing determination signal based on the measured noise amount;
- adjusting a timing at which a frequency is switched and a timing at which an offset correction signal is switched, based on the timing determination signal;
- supplying by an offset adjustment unit the offset correction signal having a correction value corresponding to the frequency of a local oscillation signal from a local oscillator to an output from a mixer that mixes a received signal and the local oscillation signal; and
- adjusting a timing at which the offset correction signal from the offset adjustment unit is switched, in correspondence with the timing at which the local oscillation signal frequency in the local oscillator is switched.

18. An offset correction method of a radio communication apparatus, the method comprising:
- supplying by an offset adjustment unit an offset correction signal having a correction value corresponding to a frequency of a local oscillation signal from a local oscillator to an output from a mixer that mixes a received signal and the local oscillation signal; and
- adjusting a timing at which the offset correction signal from the offset adjustment unit is switched in correspondence with a timing at which the local oscillation signal frequency in the local oscillator is switched, the adjusting the timing comprising:
  - receiving, by a control unit, a timing adjustment start signal,
  - setting, by the control unit, a timing adjustment signal after being notified of the start of timing adjustment,
  - storing, by the control unit, a set amount of the timing adjustment signal in a memory,
  - controlling, by the control unit, the local oscillator to execute a frequency hopping for timing adjustment,
  - measuring, by a noise amount measurement and calculation unit, a noise amount of an output of analog-to-digital conversion during the frequency hopping and outputting the noise amount measurement result signal to a memory,
  - performing, by a noise amount measurement and calculation unit, control to change a set amount of the timing adjustment signal, based on the noise amount measurement result,
  - repeating, by a noise amount measurement and calculation unit, a control operation of deciding whether or not the set amount of the timing adjustment signal is in a range that can be set and outputting, if it is possible to set the set amount, the set amount of the timing adjustment signal,
  - obtaining, by the noise amount measurement and calculation unit, a minimum value among the measurement results of the noise amount measurement result signal held in the memory, obtaining a set amount of the timing adjustment signal corresponding to the minimum value from the memory, and outputting the set amount to the control unit, and
  - performing, by the control unit, control to set the obtained set amount in the timing adjustment signal and to output the set value to a timing adjustment unit.

* * * * *